Aug. 29, 1944.     J. M. ENGLISH     2,357,188
HUB FOR COASTER BRAKE
Filed July 1, 1943
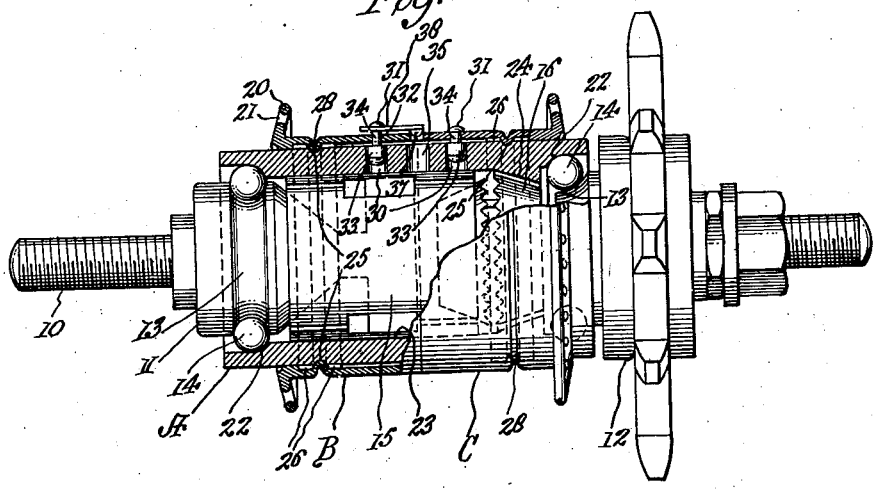
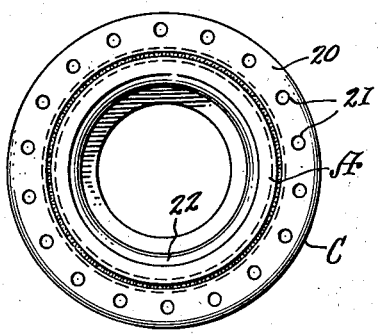
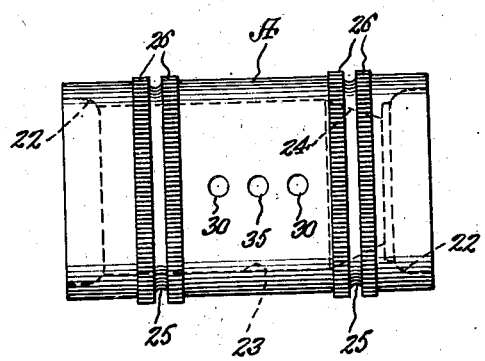
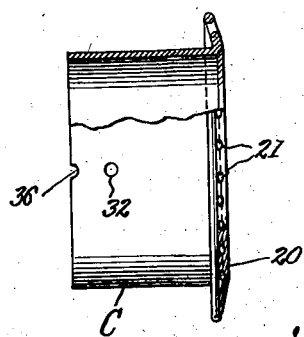
Inventor
John M. English
By Lindsey and Robillard
Attorneys.

Patented Aug. 29, 1944

2,357,188

UNITED STATES PATENT OFFICE 2,357,188

HUB FOR COASTER BRAKES

John M. English, Norwich, Conn.

Application July 1, 1943, Serial No. 493,087

3 Claims. (Cl. 301—106)

The present invention relates to coaster brakes for bicycles, and particularly to the construction of the hub thereof.

The general aim of the invention is to provide a hub having various features of novelty and advantage and which is particularly characterized by its simplicity in construction and arrangement, its economy in manufacture and assembly, its durability in use, and by its neat and pleasing appearance.

A more particular aim of the invention is to provide an improved wheel hub, the parts of which are of simple construction and may be readily and cheaply made by simple and inexpensive operations without undue expenditure of time, labor, and material.

A further aim is to provide a wheel hub of this character in which the parts are secured together in a simple and effective manner to produce a sturdy, effective unit.

Another advantage of my improved construction is that the hub shell can be hardened before the flanges are assembled thereon, thus eliminating, to a large extent, the expensive, laborious, and time-consuming practice heretofore employed in hardening the shell portion of the hub while preventing undue hardening of the flanges which were formed integral with the shell.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein I have shown, for illustrative purposes, one embodiment which the present invention may take:

Figure 1 is a view, partly in elevation and partly in longitudinal section, of a coaster brake in which my improved hub is incorporated;

Fig. 2 is an end view of the hub;

Fig. 3 is an elevational side view of the barrel or shell of the hub; and

Fig. 4 is a side view, partly in section, of one of the flanged sleeves.

Referring to the drawing in detail, I have shown in Fig. 1, for illustrative purposes, my improved hub incorporated in a coaster brake, the internal parts of which may be of any suitable construction. These parts are, therefore, shown only in part. Generally, the brake is shown as having the usual axle 10, a member 11 threaded thereon, and a driving member 12 rotatably mounted on the axle. The members 11 and 12 have ball races 13 for accommodating bearing balls 14 which rotatably support my improved hub construction. The brake further has brake shoes 15 and a conical clutch member 16.

Referring now to the construction of my improved hub, the same includes a hardened steel barrel or shell A and two metal flanged sleeves B and C forced onto the shell and permanently secured thereto in the manner described hereinafter more in detail. The flanges 20 which are formed integral with the sleeves have spoke holes 21. The shell or barrel is preferably formed from a round piece of steel stock, either bar stock or tubing, which has an outside diameter corresponding to the desired diameter of the finished shell. The shell has a through bore provided at its opposite ends with raceways 22 for the bearing balls 14. The bore, for a major portion of its length, is cylindrical so as to provide a braking surface 23 into engagement with which the brake shoes are adapted to be expanded when the driving member 12 is rotated in a retrograde direction by back pedalling. This braking surface 23 terminates at one end in a conical or tapered clutch surface 24, and the conical clutch member 16 is adapted to be moved into and out of clutched engagement with this surface. On the external surface of the shell to each side of the center or intermediate portion thereof is an annular circumferential groove 25, and to each side of each groove is an annular circumferential ring of relatively short, longitudinally extending teeth 26, the outer edges of which extend beyond the periphery of the shell. The rings of teeth are preferably formed by a knurling operation.

The flanged sleeves B and C are formed from sheet metal by stamping, drawing, and forming operations which may be carried out in presses. The spoke holes 21 may be pierced as the sheet metal blanks pass through the press. Each of the members B and C has a cylindrical sleeve portion of an internal diameter corresponding to the external diameter of the shell or barrel so as to closely fit thereabout when driven or forced thereon. The sleeve portions are preferably of such length that when properly forced upon the hub, the inner ends of the sleeves abut, as shown in Fig. 1.

The parts of the hub having been formed, the sleeves B and C are forced onto the shell over the opposite ends of the latter. When thus forced onto the shell, the teeth 26 cut grooves in the inner peripheries of the sleeves so that these teeth are embedded in the wall of the bore of the sleeves, thus locking the parts securely against movement relative to one another. The portions of the sleeve directly surrounding the grooves 25 are then forced into these grooves, as by means of a spinning or rolling operation. Thus, there is formed on each of the sleeves an inwardly extending circumferential corrugation or rib 28 which engages in the respective groove 25 so that the sleeves are very securely locked against endwise movement on the hub shell.

In order to further secure the sleeves against rotary and longitudinal movements relative to the hub shell, the hub shell is provided to each side of its intermediate portion with a radial hole 30 into which extends a rivet 31 passing through a registering hole 32 in the sleeve portion of the shell. The holes 30 are of somewhat larger diameter than the holes 32. Each rivet has a head 33 closely fitting in the respective hole 30 and a reduced stem 34 closely fitting in the respective hole 32.

The shell further has a centrally-disposed, radially-extending oil hole 35, and the inner ends of the sleeve have semi-circular notches 36 which, when the sleeves are assembled in place, register with one another to form a hole which is in registry with the oil hole 35. The oil hole formed by the notches 36 is normally closed by a valve or cover 37 carried by an arm 38 which is held in place by one of the rivets 31.

From the foregoing description, taken in connection with the accompanying drawing, it will be seen that my improved hub has various features of novelty and advantage. The parts of the hub may be manufactured by very simple operations which may be carried out with a minimum amount of labor and time and with a considerable saving in material. The hub shell, being made of round stock or tubing which comes from the steel mill with the correct outside diameter finished to exact size, requires only relatively simple tooling operations for making the bore of the shell of the desired configuration. The operations incident to forming the grooves 25, forming the rings of teeth 26, and boring the holes 30 and 35 may be very economically and quickly carried out. The tooling of this hub shell is entirely simple and inexpensive as compared to the tooling required for hubs as now usually made and wherein the flanges and hub shell are turned from a single piece of stock. The two sleeves of my improved construction may, as previously pointed out, be formed from sheet metal by suitable stamping, forming, drawing, and piercing operations in presses now available so that they may be manufactured at a relatively low cost. Another advantage is that the hub shell can be hardened throughout without hardening the flanges. When the flanges are formed as an integral part of the hub, the flanges, being of light section as compared with the remainder of the hub, will often crack or break in the heat treating or hardening process, and the flanges often break in service. With my improved arrangement, the shell may be hardened and, thereafter, the flanged sleeves, which are relatively softer, may be assembled on the hardened shell thus avoiding these difficulties and also the labor and time-consuming process heretofore required in hardening the shell portion without unduly hardening the flanges which were formed integral therewith. The operations of forcing the sleeves onto the hub and forming the corrugations 28 in the sleeves may also be very simply and economically carried out, and when the parts have been assembled, the sleeves are securely held against all movement relative to the shell. By providing the smaller holes 32 in the sleeves and the larger holes 30 in the shell, these holes, when the parts are assembled, line up with one another so as to form, in effect, internally counterbored holes for the rivets which further aid in binding the sleeves and the hub shell against movement relative to one another. The heads of the rivets do not interfere with the braking surface 23 provided on the inside periphery of the shell. The external surfaces of the sleeves and the flanges may be suitably finished or chromium plated before they are forced onto the shell. As these sleeves cover the central portion of the shell, they present a continuous, well appearing surface.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a hub of the character described, a hardened shell member having a generally cylindrical periphery provided to each side of the central portion thereof with a pair of annular, longitudinally extending, relatively short teeth projecting beyond the periphery of the shell member, and a groove between each pair of rings of teeth; and a pair of sheet metal sleeves each provided at its extreme end with an outwardly extending, pierced flange, said sleeves being of substantially the same internal diameter as the external diameter of said shell so that they will closely fit thereabout when driven thereon and said teeth are embedded in the internal walls of the sleeves, said sleeves having beads or corrugations respectively fitting in said grooves.

2. In a hub of the character described, a hardened cylindrical shell member having about its periphery to each side of the central portion of the shell member an annular ring of teeth, the outer edges of which extend beyond the circumferential surface of the shell member, said shell member also having a radial hole to each side of the longitudinal center of the shell member; a pair of sheet metal sleeves about said shell member and having integral pierced flanges at their extreme ends, each of said sleeves having an internal diameter substantially the same as that of the external diameter of the shell member so that, when the sleeves are forced on the latter, the teeth are embedded in the walls of the sleeves, said sleeves having radial holes of lesser diameter than, and respectively registering with, said first mentioned holes; and rivets having heads fitting in the first mentioned holes and reduced stem extending through the holes in the sleeves.

3. In a hub of the character described, a hardened shell member having a generally cylindrical periphery provided to each side of the central portion thereof with a pair of annular, longitudinally extending, relatively short teeth projecting beyond the periphery of the shell member, and a groove between each pair of rings of teeth, said shell member having a radial hole to each side of its intermediate portion; a pair of sheet metal sleeves each provided at its extreme end with an outwardly extending, pierced flange, said sleeves being of substantially the same internal diameter as the external diameter of said shell so that they will closely fit thereabout when driven thereon and said teeth are embedded in the internal walls of the sleeves, said sleeves having beads or corrugations respectively fitting in said grooves, said sleeves also having radial holes of lesser diameter than, and respectively registering with, said holes in said shell member; and rivets having heads fitting in said holes of said member and stems extending through said holes of said sleeves.

JOHN M. ENGLISH.